(12) United States Patent
Lee et al.

(10) Patent No.: US 8,045,639 B2
(45) Date of Patent: Oct. 25, 2011

(54) METHOD FOR TRANSMITTING DATA IN A MIMO COMMUNICATION SYSTEM

(75) Inventors: Yeon-Woo Lee, Seongnam (KR); Sang-Boh Yun, Seongnam-si (KR); Harald Haas, Bremen (DE); Raed Mesleh, Bremen (DE); Steve McLaughlin, Edinburgh (GB)

(73) Assignees: Samsung Electronics Co., Ltd., Suwon-si (KR); The University Court of The University of Edinburgh Old College, Edinburgh (GB)

( * ) Notice: Subject to any disclaimer, the term of this patent is extended or adjusted under 35 U.S.C. 154(b) by 1414 days.

(21) Appl. No.: 11/481,517

(22) Filed: Jul. 6, 2006

(65) Prior Publication Data

US 2007/0009058 A1    Jan. 11, 2007

(30) Foreign Application Priority Data

Jul. 6, 2005    (KR) .................. 10-2005-0060776

(51) Int. Cl.
*H04L 1/02*    (2006.01)
*H04L 27/28*    (2006.01)
*H04J 11/00*    (2006.01)
*H04B 7/02*    (2006.01)

(52) U.S. Cl. ........ 375/267; 375/260; 370/203; 370/208; 370/335; 455/69; 455/101

(58) Field of Classification Search .................. 370/335, 370/389, 203, 206; 375/267, 260; 455/562.1, 455/69, 101, 127.1, 276.1, 517
See application file for complete search history.

(56) References Cited

U.S. PATENT DOCUMENTS

| 7,505,788 | B1 * | 3/2009 | Narasimhan | 455/562.1 |
| 2004/0208145 | A1 * | 10/2004 | Sim et al. | 370/335 |
| 2005/0013239 | A1 * | 1/2005 | Agrawal et al. | 370/206 |
| 2005/0063378 | A1 * | 3/2005 | Kadous | 370/389 |
| 2005/0175115 | A1 * | 8/2005 | Walton et al. | 375/267 |
| 2005/0266902 | A1 * | 12/2005 | Khatri et al. | 455/575.7 |

(Continued)

FOREIGN PATENT DOCUMENTS

EP    1 394 980 A1    3/2004

OTHER PUBLICATIONS

"Increasing spectral efficiency by data multiplexing using antenna arrays" Haas, H.; Costa, E.; Schulz, E.; Personal, Indoor and Mobile Radio Communications, 2002. The 13th IEEE International Symposium on vol. 2, Sep. 15-18, 2002, pp. 610-613 vol. 2.*

(Continued)

*Primary Examiner* — Chieh M Fan
*Assistant Examiner* — Eboni Hughes
(74) *Attorney, Agent, or Firm* — NSIP Law

(57) ABSTRACT

Provided is a multiple-input multiple-output (MIMO) data transmission method. A transmitter generates a transmission symbol by adding a parity symbol to a predetermined number of data symbols, generates a preprocessed symbol by multiplying the predetermined number of transmission symbols by a preprocessing matrix in units of blocks, selects a transmission antenna associated with a non-zero transmission symbol among preprocessed transmission symbols constituting the preprocessed symbol, and transmits the preprocessed symbol via the selected transmission antenna. A receiver receives a signal transmitted from the transmitter, estimates a preprocessed symbol and a transmission antenna index from the received signal, and restores the transmission symbols using the estimated preprocessed symbol and transmission antenna index.

12 Claims, 2 Drawing Sheets

U.S. PATENT DOCUMENTS

2006/0140297 A1* 6/2006 Maltsey et al. ............... 375/260
2008/0225975 A1* 9/2008 Lee et al. ...................... 375/267
2009/0239486 A1* 9/2009 Sugar et al. ................... 455/101

OTHER PUBLICATIONS

Haas, H.; Costa, E.; Schulz, E.; "Increasing spectral efficiency by data multiplexing using antenna arrays"; Personal, Indoor and Mobile Radio Communications, 2002. The 13th IEEE International Symposium on vol. 2, Sep. 15-18, 2002, pp. 610-613 vol. 2.*

Haas, H.; Costa, E.; Schulz, E.; "Increasing spectral efficiency by data multiplexing using antenna arrays"; Personal, Indoor and Mobile Radio Communications, 2002. The 13th IEEE International Symposium on vol. 2, Sep. 15-18, 2002, pp. 610-613.*

H. Haas et al., Increasing Spectral Efficiency by Data Multiplexing Using Antenna Arrays, 2002.

* cited by examiner

METHOD FOR TRANSMITTING DATA IN A MIMO COMMUNICATION SYSTEM

PRIORITY

This application claims priority under 35 U.S.C. §119(a) of an application entitled "Method for Transmitting Data in a MIMO Communication System" filed in the Korean Intellectual Property Office on Jul. 6, 2005 and assigned Serial No. 2005-60776, the entire contents of which are incorporated herein by reference.

BACKGROUND OF THE INVENTION

1. Field of the Invention

The present invention relates generally to a Multiple-Input Multiple-Output (MIMO) communication system, and in particular, to a MIMO data transmission method for improving spectrum efficiency using a data multiplexing technique.

2. Description of the Related Art

The increasing demand for various broadband services such as high-speed Internet access and high-quality video services as well as the recent development of semiconductor and display device technology. There is ongoing research to more efficiently utilize the limited frequency resources for broadband wireless data transmission service in the $3^{rd}$ generation (3G) and $4^{th}$ generation (4G) mobile communication technology fields. Various techniques such as Spatial Division Multiple Access (SDMA), Space-Time Coding (STC), and Beam Forming based on a MIMO antenna system have been recently provided toward this end.

The MIMO system uses the STC technique to divide a channel into a plurality of independent spatial channels using multiple transmission antennas and multiple reception antennas and to secure the capacity.

A Vertical Bell Labs Layered Space Time (V-BLAST) algorithm, which is a well-known MIMO technique, can obtain spectrum efficiency of 20 to 40 bps/Hz for actual signal-to-noise ratio (SNR) range and bit error performance in an indoor rich scattering propagation environment. The high spectrum efficiency results from a multiplexing gain by parallel data transmission. The V-BLAST technique uses its unique detection algorithm different from the joint detection algorithm. That is, the detection algorithm of the V-BLAST technique first decodes the highest-power signal, and continuously decodes the highest-power signal among the signals remaining after canceling an influence of the decoded signal from each of the received signals. Such a decoding method is called optimum ordering (OR) and successive interference cancellation (SIC).

However, in order to increase the spectrum efficiency, the V-BLAST technique simultaneously transmits independent data streams via multiple transmission antennas, so a receiver suffers inter-channel interference (ICI) and the ICI increases with the number of the transmission antennas.

In addition, the V-BLAST technique is inoperable when the number of transmission antennas is greater than the number of reception antennas. Further, the V-BLAST technique cannot expect high performance even when the number of transmission antennas is equal to the number of reception antennas.

SUMMARY OF THE INVENTION

It is, therefore, an object of the present invention to provide a data multiplexing-based MIMO data transmission method for improving system performance by basically avoiding occurrence of ICI.

It is another object of the present invention to provide a data multiplexing-based MIMO data transmission method for dramatically reducing received signal processing complexity by estimating the number of transmission antennas using space information during signal reception.

According to an aspect of the present invention, there is provided a method for transmitting data in a multiple-input multiple-output (MIMO) communication system that includes a transmitter for transmitting a signal via multiple transmission antennas having their own unique indexes and at least one receiver for receiving a signal via at least one reception antenna. The method includes compressing, at the transmitter, a predetermined number of transmission symbols mapped to each of the transmission antennas into one compressed symbol; transmitting the compressed symbol via one of the transmission antennas using a high frequency; estimating, at the receiver, a compressed symbol and a transmission antenna index from a received signal; and restoring transmission symbols using the estimated compressed symbol and transmission antenna index.

According to another aspect of the present invention, there is provided a method for transmitting data in a multiple-input multiple-output (MIMO) communication system that includes a transmitter for transmitting a signal via multiple transmission antennas having their own unique indexes and at least one receiver for receiving a signal via at least one reception antenna. The method includes generating, at the transmitter, a transmission symbol by adding a parity symbol to a predetermined number of data symbols; generating a preprocessed symbol by multiplying the predetermined number of transmission symbols by a preprocessing matrix in units of blocks; selecting a transmission antenna associated with a non-zero transmission symbol among preprocessed transmission symbols constituting the preprocessed symbol; and transmitting the preprocessed symbol via the selected transmission antenna.

Preferably, the preprocessed symbol is multiplied by a space correlation coefficient expressed as $\exp(j*(i-1)*\theta)$, where i denotes a transmission antenna index (i=1 . . . N), $\theta$ denotes an angle obtained by dividing 90° by the number of transmission antennas, and j denotes a row index of a preprocessing matrix.

Preferably, the receiver receives a signal transmitted from the transmitter, estimates a preprocessed symbol and a transmission antenna index from the received signal, and restores the transmission symbols using the estimated preprocessed symbol and transmission antenna index.

Preferably, the step of estimating a preprocessed symbol and a transmission antenna index includes estimating a preprocessed symbol by using a maximum ratio combining (MRC) technique for the received signal; determining whether phase information $\angle(t)$ which is included in the received signal is greater than $(N-1+0.5)*\theta$, where N denotes the number of transmission antennas; and if $\angle(t)$ is greater than $(N-1+0.5)*\theta$, then selecting a transmission antenna index for which a phase of the received signal is spatially nearest, considering that $\angle(t)=\angle(t)-\pi/2$.

Preferably, the preprocessing matrix is one of a Hadamard matrix and a Fourier matrix.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

With reference to the accompanying drawings, a detailed description will now be made of a data multiplexing-based MIMO data transmission method according to the present invention.

Figure 1:
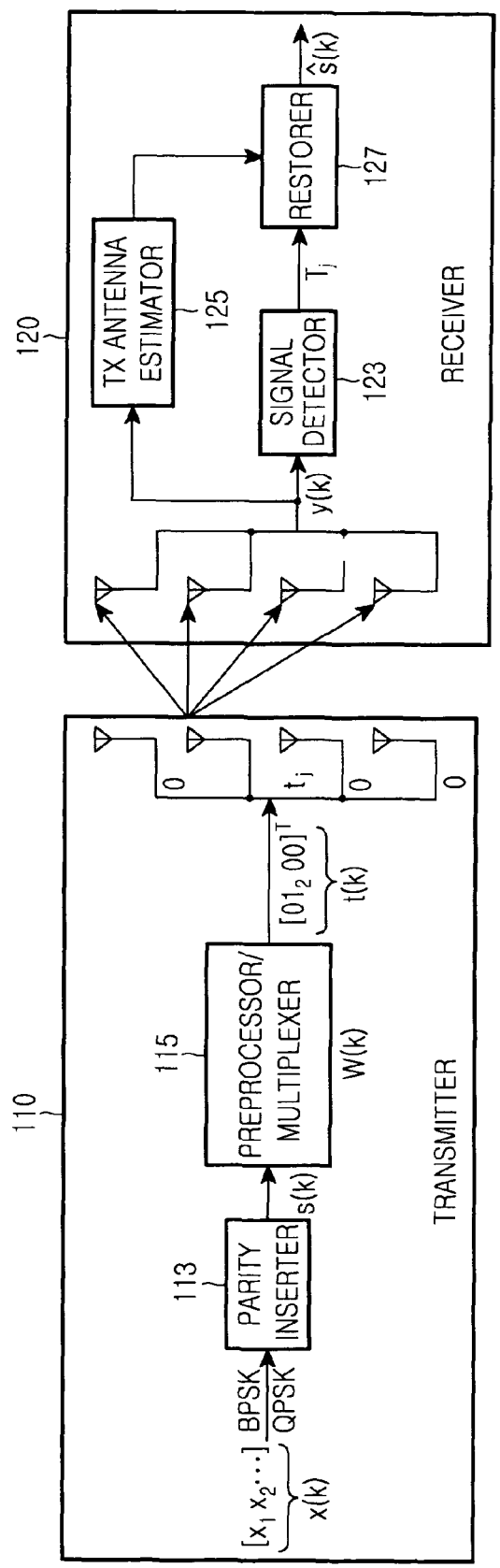
FIG. 1 is a block diagram schematically illustrating the architecture of a MIMO system to which a data multiplexing-based data transmission method is to be applied according to the present invention.

FIG. 1 is a block diagram schematically illustrating the architecture of a MIMO system to which a data multiplexing-based data transmission method is to be applied according to an embodiment of the present invention.

As illustrated in FIG. 1, the MIMO system of the present invention includes a transmitter 110 and a receiver 120. The transmitter 110 includes a parity inserter 113 for inserting parity symbols into modulation symbols obtained by modulating input bits according to a predetermined modulation scheme to generate transmission symbols S(k), and a preprocessor/multiplexer 115 for preprocessing the transmission symbols output from the parity inserter 113 in units of N blocks to generate preprocessed symbols t(k) and outputs the preprocessed symbols t(k) to one of multiple transmission antennas. The receiver 120 includes a signal detector 123 for estimating preprocessed symbols from the signals received via multiple reception antennas, a transmission antenna estimator 125 for estimating a transmission antenna from the received signals, and a restorer 127 for restoring the transmission symbols using the symbols detected by the signal detector 123 and the transmission antenna information estimated by the transmission antenna estimator 125.

The preprocessed symbols are generated by the preprocessor/multiplexer 115 by multiplying input transmission symbol vectors by a preprocessing matrix. A Hadamard matrix is used as the preprocessing matrix when a modulation scheme of the transmitter 110 is Binary Phase Shift Keying (BPSK), and a Fourier matrix is used as the preprocessing matrix when the modulation scheme of the transmitter 110 is Quadrature Phase Shift Keying (QPSK).

The elements constituting each of the preprocessed symbols are transmitted via one of N transmission antennas, and an antenna mapped to a non-zero element among the elements is selected as a transmission antenna.

For example, if a preprocessed symbol output from the preprocessor/multiplexer 115 is given as $t(k)=[0, t_j, 0, 0]$, because elements other than a second element $t_j$ among the elements constituting the preprocessed symbol are all zero (0), a second antenna mapped to the second element is selected as a transmission antenna.

Assuming that there is no correlation between transmission paths, the receiver 120 can determine an index of the transmission antenna used for transmission and demultiplex received signals using the determined transmission antenna index. In the present invention, a Maximum Ratio Combining (MRC) technique is used to estimate a preprocessed symbol $\tilde{t}_j$, and a Zero Forcing (ZF) or Minimum Mean Square Error (MMSE) technique is used to estimate a transmission antenna index. Antenna index estimations based on the ZF and MMSE techniques can be expressed as Equation (1) and Equation (2), respectively.

$$\text{idx ZF} = \arg\max(|H^+ y|) \quad (1)$$

$$\text{idx MMSE} = \arg\max(|[H^H H + I_N/\rho]^{-1} H^H y|) \quad (2)$$

where ρ denotes a Signal-to-Noise Ratio (SNR) at an input terminal of a receiver, H denotes a channel matrix, y denotes a received vector, and $I_N$ denotes an N×N identity matrix.

In the transmission technique according to an embodiment of the present invention, performance of the receiver 120 depends upon accuracy of transmission antenna estimation.

A received vector y=Ht+n represents signals received via M transmission antennas, wherein n denotes a noise vector. The received transmission vector is calculated by Equation (3) below, $$\hat{s}(k) = (\tilde{t}_j^* <W>_{\text{idx}})^* \quad (3)$$

where $<W>_j$ denotes a $j^{th}$ row of a preprocessing matrix W.

In a data transmission method according to the present invention, if BPSK is used, the parity inserter 113 inserts a parity symbol into a modulation symbol x=[−1,1,−1] to be transmitted, and outputs a transmission symbol s=[−1,1,−1,1], and the preprocessor/multiplexer 115 multiplexes the transmission symbol, and multiplies the multiplexed transmission symbol by a Hadamard matrix W of Equation (4) below, outputting a preprocessed symbol t=[0,−4,0,0].

$$W = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (4)$$

Because only the second element among the elements constituting the preprocessed symbol is not zero (0), the preprocessed symbol is transmitted via a second antenna.

The preprocessed symbol is transmitted via the second antenna after being normalized to $t_j=-1$. In the receiver 120, the restorer 127 restores a demultiplexed signal $\hat{s}(k)=[-1,1,-1,1]$ in accordance with Equation (3) using a transmission antenna index idx=2 estimated by the transmission antenna estimator 125 from received signals and a preprocessed symbol $\tilde{t}_j=-1$ estimated by the signal detector 123.

In the data transmission method according to the present invention, if QPSK is used, the parity inserter 113 inserts two parity symbols into a modulation symbol x=[−i,−1] to be transmitted, and outputs a transmission symbol s=[−i,1,i,−1], and the preprocessor/multiplexer 115 multiplexes the transmission symbol and multiplies the multiplexed transmission symbol by a Fourier matrix W of Equation (5) below, outputting a preprocessed symbol t=[0,−4i,0,0] where i is an imaginary number and $i=\sqrt{-1}$.

$$W = \begin{pmatrix} 1 & 1 & 1 & 1 \\ 1 & -i & -1 & i \\ 1 & -1 & 1 & -1 \\ 1 & i & -1 & -i \end{pmatrix} \quad (5)$$

Because only the second element among the elements constituting the preprocessed symbol is not zero (0), the preprocessed symbol is transmitted via a second antenna. The preprocessed symbol is transmitted via the second antenna after being normalized to $t_j=-i$. In the receiver 120, the restorer 127 restores a demultiplexed signal $\hat{s}(k)=[-i,1,i,-1]$ in accordance with Equation (3) using a transmission antenna index idx=2 estimated by the transmission antenna estimator 125 from received signals and a preprocessed symbol $\tilde{t}_j=-i$ estimated by the signal detector 123.

Figure 2:
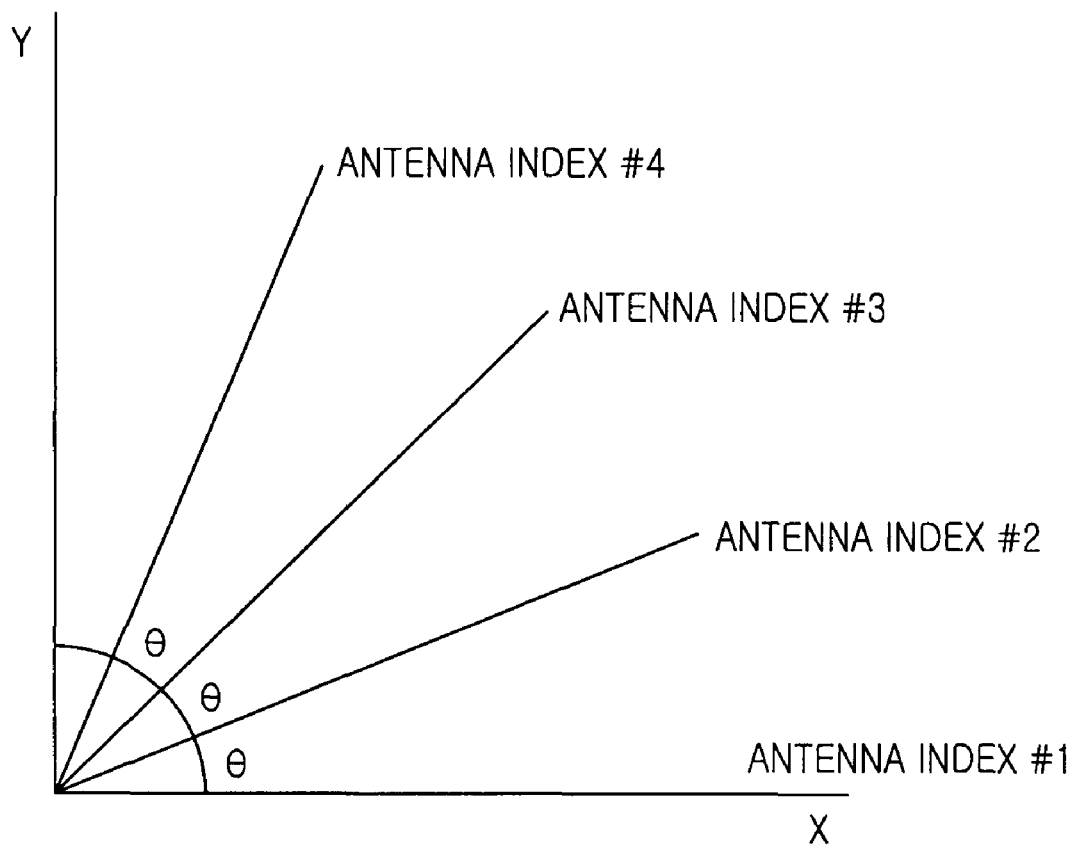
FIG. 2 is a conceptual graphical diagram illustrating a description of an antenna estimation technique for a data transmission method according to the present invention.

FIG. 2 is a conceptual graphical diagram illustrating a description of an antenna estimation technique for a data transmission method according to another embodiment of the present invention.

In this embodiment, each transmission antenna of the transmitter 110 is mapped to a particular point of a constellation, and for QPSK transmission, the space is divided into four (4) uniform subspaces.

If a transmission antenna is selected as a result of the preprocessing, the transmitter 110 multiplies a preprocessed symbol to be transmitted via the selected transmission antenna by exp(j*(i−1)*θ) before transmission. Herein, i denotes a transmission antenna index (i=1 . . . N), θ is 90°/4, and j denotes a row index of a preprocessing matrix.

In this case, because θ=22.5°, an antenna index #1, an antenna index #2, an antenna index #3 and an antenna index #4 are mapped to 0°, 22.5°, 45° and 67.5°, respectively.

Upon receiving a signal, the receiver 120 estimates a preprocessed symbols t through an MRC algorithm, and determines whether ∠(t)>3.5*θ is satisfied, using phase information included in the received signal. If ∠(t)>3.5*θ is satisfied, the receiver 120 calculates the minimum distance for all possible combinations to estimate an antenna index î, determining that ∠(t)=∠(t)−π/2, and restores the transmission symbol from the preprocessed symbol.

As can be understood from the foregoing description, the data multiplexing-based MIMO data transmission method according to the present invention transmits compressed data using only one of multiple transmission antennas, thereby avoiding inter-channel interference (ICI) while maintaining the data rate.

In addition, the data multiplexing-based MIMO data transmission method according to the present invention transmits data along with space information, so a receiver estimates a transmission antenna using the space information, contributing to a dramatic reduction in the signal processing complexity for antenna estimation.

Further, the data multiplexing-based MIMO data transmission method according to the present invention avoids the ICI problem of the MIMO system and noticeably reduces transmission antenna estimation complexity, thereby contributing to improvement of the communication system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data in a multiple-input multiple-output (MIMO) communication system including a transmitter for transmitting a signal via multiple transmission antennas each having unique indexes and at least one receiver for receiving a signal via at least one reception antenna, the method comprising:
   compressing, at the transmitter, a predetermined number of transmission symbols mapped to each of the transmission antennas into one compressed symbol;
   inserting space information indicating a transmission antenna, into the compressed symbol;
   transmitting the compressed symbol via a first transmission antenna from among the multiple transmission antennas;
   estimating, at the receiver, the compressed symbol from a received signal;
   estimating, at the receiver, a transmission antenna index corresponding to the first transmission antenna based on phase information of the received signal, wherein the receiver selects a transmission antenna index of which the phase of the received signal is spatially nearest, as the estimated transmission antenna index; and
   restoring transmission symbols based on the estimated compressed symbol and transmission antenna index.

2. The method of claim 1, wherein the compressing comprises:
   generating a compressed symbol by multiplying the transmission symbols by a preprocessing matrix; and
   mapping the compressed symbol to a transmission antenna associated with a non-zero transmission symbol among the transmission symbols constituting the compressed symbol.

3. The method of claim 2, wherein the preprocessing matrix is a Hadamard matrix.

4. The method of claim 2, wherein the preprocessing matrix is a Fourier matrix.

5. The method of claim 1, wherein the compressed symbol is estimated by a maximum ratio combining (MRC) technique.

6. The method of claim 1, wherein the antenna index is estimated by one of zero forcing (ZF) and minimum mean square error (MMSE) techniques.

7. The method of claim 1, wherein the space information is inserted by multiplying the compressed symbol by exp(j*(i−1)*θ), where denotes a transmission antenna index (i=1 . . . N), θ denotes an angle obtained by dividing 90° by the number of transmission antennas, and j denotes a row index of a preprocessing matrix.

8. The method of claim 1, wherein the step of estimating the compressed symbol and the transmission antenna index comprises:
   estimating a compressed symbol by using an MRC technique for the received signal;
   determining whether the phase information ∠(t) included in the received signal is greater than (N−1+0.5)*θ, where N denotes the number of transmission antennas; and
   if ∠(t) is greater than (N−1+0.5)*θ, selecting a transmission antenna index for which a phase of the received signal is spatially nearest, considering that ∠(t)=∠(t)−π/2.

9. The method of claim 1, wherein the number of transmission antennas of the transmitter is greater than the number of reception antennas of the receiver.

10. A receiver in a multiple-input multiple-output (MIMO) communication system, the receiver comprising:
    one or more antennas for receiving a compressed symbol from a first transmission antenna of a transmitter, wherein the transmitter includes a plurality of transmission antennas and the one or more antennas only receive the compressed symbol from the first transmission antenna;
    a signal detector for estimating the compressed symbol from the received signal;
    a transmission antenna estimator for estimating a transmission antenna index corresponding to the first transmission antenna based on phase information ∠(t) of the received signal, wherein the receiver selects a transmission antenna index of which the phase of the received signal is spatially nearest, as the estimated transmission antenna index; and
    a restorer for restoring transmission symbols based on the estimated compressed symbol and transmission antenna index.

11. The receiver of claim 10, wherein the transmission antenna estimator determines whether the phase information ∠(t) included in the received signal is greater than (N−1+0.5)*θ, where N denotes the number of transmission antennas.

12. The receiver of claim 11, wherein, if ∠(t) is greater than (N−1+0.5)*θ, the transmission antenna estimator selects a transmission antenna index for which a phase of the received signal is spatially nearest, considering that ∠(t)=∠(t)−π/2.

* * * * *